United States Patent
Shi et al.

(10) Patent No.: US 12,385,451 B2
(45) Date of Patent: Aug. 12, 2025

(54) INJECTOR FOR GASEOUS FUEL

(71) Applicant: PHINIA DELPHI LUXEMBOURG SARL, Belvaux (LU)

(72) Inventors: Junmei Shi, Trier (DE); Guy Hoffman, Sandweiler (LU)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 0 days.

(21) Appl. No.: 18/717,793

(22) PCT Filed: Dec. 2, 2022

(86) PCT No.: PCT/EP2022/084240
§ 371 (c)(1),
(2) Date: Jun. 7, 2024

(87) PCT Pub. No.: WO2023/104664
PCT Pub. Date: Jun. 15, 2023

(65) Prior Publication Data
US 2025/0052216 A1 Feb. 13, 2025

(30) Foreign Application Priority Data
Dec. 9, 2021 (GB) ...................................... 2117833

(51) Int. Cl.
*F02M 21/02* (2006.01)
(52) U.S. Cl.
CPC ...... *F02M 21/026* (2013.01); *F02M 21/0269* (2013.01); *F02M 21/0275* (2013.01)
(58) Field of Classification Search
CPC ............. F02M 21/026; F02M 21/0275; F02M 21/0269; F02M 21/0281; F02M 61/1806; F02M 61/1826; F02B 19/18; F02B 19/108
See application file for complete search history.

(56) References Cited

U.S. PATENT DOCUMENTS 3,062,198 A 11/1962 Richardson
5,383,647 A 1/1995 Jorach et al.
(Continued)

FOREIGN PATENT DOCUMENTS

DE 102018211401 A1 1/2020

OTHER PUBLICATIONS

International Search Report for PCT/EP2022/084240 dated Mar. 7, 2023, 3 pages.
(Continued)

*Primary Examiner* — Grant Moubry
(74) *Attorney, Agent, or Firm* — WARNER NORCROSS + JUDD LLP

(57) ABSTRACT

A fuel injector for injecting gaseous fuels into a combustion chamber, comprising an injection nozzle including a nozzle cap, and an outward opening injection needle. The injection nozzle has a longitudinal injector axis and a tip region that is shaped to define a valve seat that extends about a central outlet opening for gaseous fuel. The outward opening injection needle is slidably received in the injection nozzle and is engageable with the valve seat to control a flow of gaseous fuel into a sac volume of the fuel injector. The nozzle cap is received over the tip region to define the sac volume, and is provided with a plurality of openings to enable the flow of gaseous fuel to pass from the sac volume into the combustion chamber when the injection needle is moved away from the valve seat.

12 Claims, 10 Drawing Sheets

(56) References Cited

U.S. PATENT DOCUMENTS

| | | | | |
|---|---|---|---|---|
| 7,198,024 | B2* | 4/2007 | Coleman | F02M 26/08 |
| | | | | 123/562 |
| 10,781,779 | B2* | 9/2020 | Ijsselstein | F02M 61/18 |
| 2007/0246003 | A1* | 10/2007 | Lee | F02M 61/1813 |
| | | | | 123/294 |
| 2012/0255517 | A1* | 10/2012 | Grover, Jr. | F02D 13/0219 |
| | | | | 123/299 |
| 2017/0122276 | A1* | 5/2017 | Zhang | F02D 41/38 |
| 2017/0138251 | A1 | 5/2017 | Watanabe et al. | |
| 2017/0175693 | A1* | 6/2017 | Hou | F02M 21/0266 |
| 2018/0058405 | A1* | 3/2018 | Zhang | F02D 41/402 |

OTHER PUBLICATIONS

Machine assisted English translation of DE102018211401A1 obtained from https://worldwide.espacenet.com/patent on Jun. 6, 2024, 10 pages.

* cited by examiner

INJECTOR FOR GASEOUS FUEL

CROSS-REFERENCE TO RELATED APPLICATIONS

This application is the U.S. National Stage of International Application No. PCT/EP2022/084240 filed on 2 Dec. 2022, which claims priority to and all advantages of United Kingdom Application No. 2117833.0 filed on 9 Dec. 2021, the contents of which are incorporated herein by reference.

TECHNICAL FIELD

The present invention relates generally to a configuration of a fuel injector suitable for injecting a gaseous fuel such as hydrogen into a combustion chamber of an internal combustion engine. The injector may be suitable for injection of other fuels.

BACKGROUND

Fuel injectors are used in combustion engines to inject fuel into a runner of an air intake manifold ahead of a cylinder intake valve or directly into the combustion chamber of an engine cylinder. Different types of fuel injectors for gaseous fuels are known. One approach is a so-called 'outward opening' fuel injector in which an injector valve needle (or pintle) is configured to lift away from a valve seat towards the combustion chamber in order to allow fuel to flow into the combustion chamber.

One challenge associated with outward opening injectors is that of achieving efficient air-fuel mixing required for homogeneous combustion. It is particularly challenging to achieve such an efficient combustion at increasing engine loads and speeds. Typically, outward opening injectors create a spray or jet plume of fuel with a hollow cone shape which is susceptible to either inward or outward collapse. As a result, it can be difficult to target the delivery of fuel to optimal regions within the combustion chamber especially at high cylinder pressures which result from high engine loads and speeds. This is especially true for gas fuel injectors due to the low fuel density. Therefore, internal combustion systems that employ such fuel injectors experience poor engine efficiency at high cylinder pressures, the efficiency varying, and typically being improved with lowering engine loads and speeds. However, without optimal jet targeting, homogeneous combustion cannot be achieved, and engine efficiency suffers as a result.

It is against this background that the invention has been devised.

SUMMARY OF THE INVENTION

Against this background, a first aspect of the invention provides a fuel injector suitable for injecting gaseous fuels into a combustion chamber, the fuel injector comprising an injection nozzle having a longitudinal injector axis and a tip region that is shaped to define a valve seat that extends about a central outlet opening for gaseous fuel; and an outward opening injection needle slidably received in the injection nozzle and engageable with the valve seat to control a flow of gaseous fuel into a sac volume of the fuel injector. The injection nozzle further includes a nozzle cap that is received over the tip region to define the sac volume, the nozzle cap being provided with a plurality of openings to enable the flow of gaseous fuel to pass from the sac volume into the combustion chamber when the injection needle is moved away from the valve seat. The plurality of openings is comprised of at least (i) at least one first opening configured to direct a first flow portion of the flow of gaseous fuel into a first zone of the combustion chamber; and (ii) a second set of openings, configured to direct a second flow portion of the flow of gaseous fuel into a second zone of the combustion chamber.

The second zone of the combustion chamber may be substantially different from the first zone of the combustion chamber and comprise regions within the combustion chamber which cannot be reached by the first flow portion of the flow of gaseous fuel. For example, the first zone may be defined as a lower portion of the combustion chamber and the second zone may be defined as an upper portion of the combustion chamber. In this way, the first and second flow portions of gaseous fuel achieve greater coverage within the combustion chamber thereby promoting greater air-fuel mixing and more efficient combustion.

The first opening may form one of a set of first openings. The or each opening of the first set may have a diameter that is different to the diameter of the or each opening of the second set. In some embodiments, the first opening may form one opening of a first set of openings. If there is only one opening in the first set, the opening may have a first flow axis which aligns with the longitudinal injector axis.

Additionally or alternatively, each opening of the second set may have a second central flow axis which defines a first angle to the longitudinal injector axis which is the same as for the other openings of the set. Further, each opening of the second set may have an inlet which opens into the sac volume which is located on a first plane perpendicular to the longitudinal injector axis. The inlets of each opening of the second set may be equiangularly spaced around the longitudinal injector axis in the first plane.

The plurality of openings may further include a third set of openings configured to direct a third flow portion of the flow of gaseous fuel into a third zone of the combustion chamber. The third zone may be substantially different to the first and second zones and comprises regions of the combustion chamber which cannot be reached by the first and second flow portions of the flow.

Each opening of the third set may have a third central flow axis which defines a second angle to the longitudinal injector axis which is different to the first angle defined by the second central flow axis to the longitudinal injector axis. Additionally or alternatively, each opening of the third set may have an inlet which opens into the sac volume which is located on a second plane perpendicular to the longitudinal axis. The second plane adopts a lower position along the longitudinal injector axis than the first plane—i.e. the second plane is lower than the first plane according to the orientation of the Figures which follow.

In some embodiments, each opening of the second set may have a diameter that is different to the diameter of each opening of the third set. Alternatively, each opening of the second set may have a diameter that is the same as the diameter of each opening of the third set.

In some embodiments, the second set of openings may include between two and five openings.

In some embodiments, the inlets of the second set of openings are angularly spaced apart from the inlets of the third set of openings around the nozzle cap in their respective planes perpendicular to the longitudinal injector axis/nozzle cap axis; and wherein the outlets of the second set of openings are angularly spaced apart from the outlets of the third set of openings around the nozzle cap in their respective planes perpendicular to the longitudinal injector axis/nozzle cap axis, such that the second central flow axis of the second set of openings is not axially aligned with the third central flow axis of the third set of openings.

In another aspect of the invention, there is provided a fuel injection system for gaseous fuel comprising a fuel injector and a combustion chamber into which the gaseous fuel is injected.

It will be appreciated that preferred or optional features of the first aspect of the invention may be incorporated in other aspects of the invention also, alone or in appropriate combination.

Further optional and advantageous features are referenced in the detailed description and the appended claims.

BRIEF DESCRIPTION OF THE DRAWINGS

So that the invention may be better understood, reference will now be made by way of example only to the following drawings in which.

DETAILED DESCRIPTION OF THE EMBODIMENTS

Figure 1:
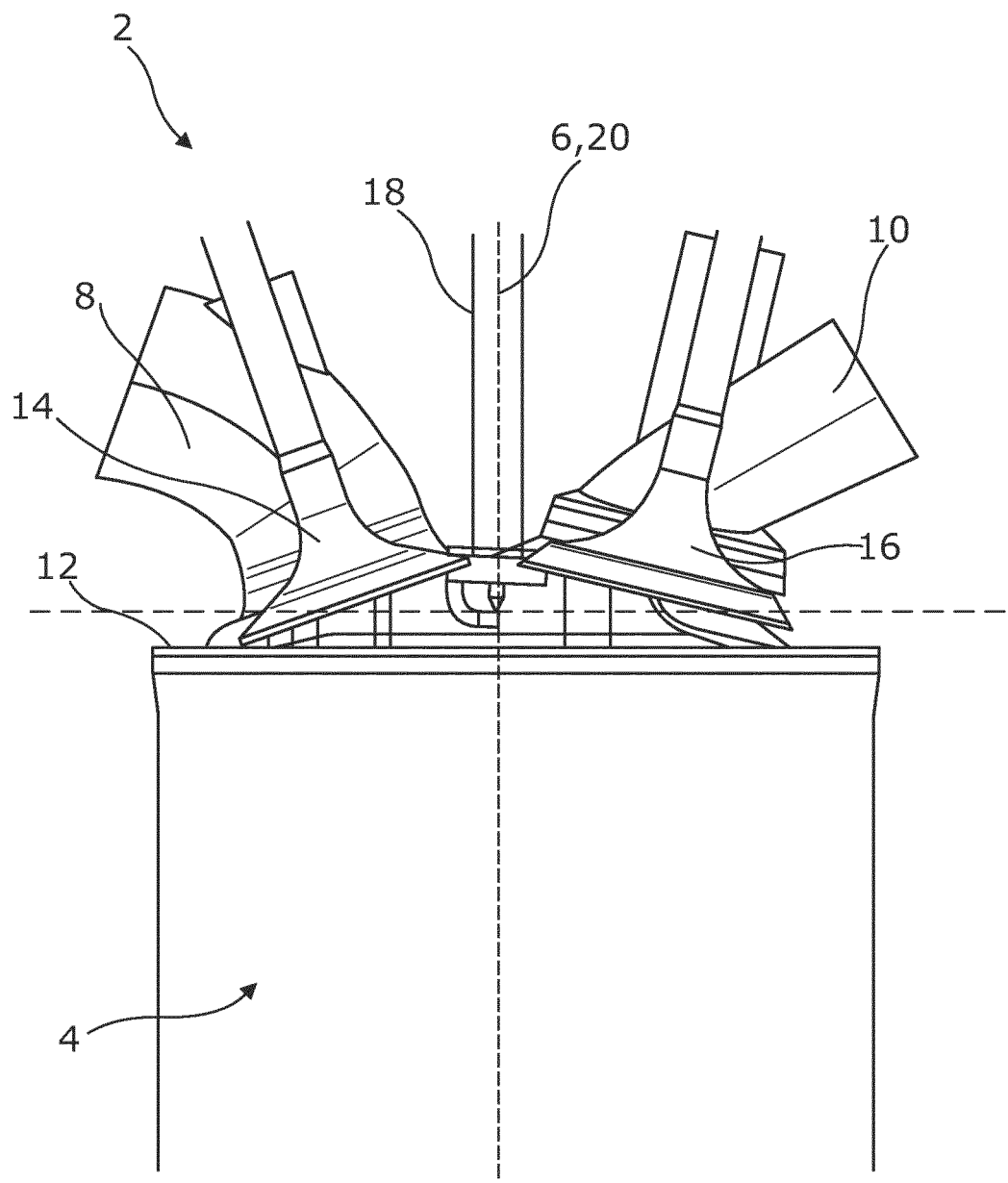
FIG. 1 is an illustration of a centre-mounted injector on a combustion chamber.

To provide context for the invention, FIG. 1 schematically shows a cross-section view of part of an engine 2. The engine 2 comprises a cylinder or combustion chamber 4 with a cylinder axis 6 which, in this context, defines a vertical direction although this vertical direction may not coincide with the direction of gravity depending on the design of the engine 2. An air intake duct 8 and an air outlet duct 10 are connected to a head 12 of the cylinder 4 with an intake valve 14 and an outlet valve 16 disposed to alternatingly open and close the respective ducts 8, 10.

Figure 2:
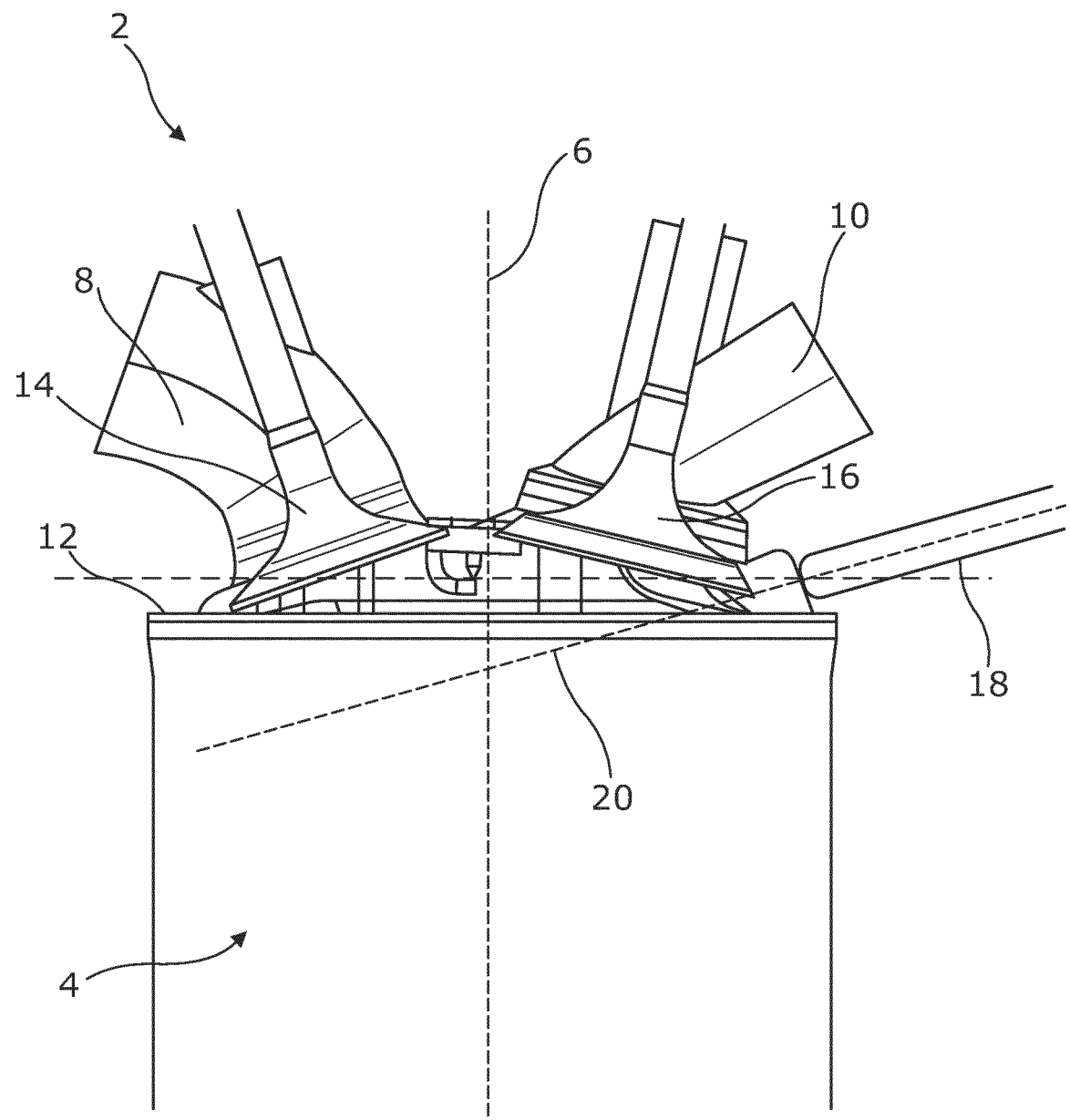
FIG. 2 is an illustration of a side-mounted injector on a combustion chamber.

A fuel injector 18 (shown only in simplified form) is installed on the head 12 of the cylinder 4 in a central mounting configuration, meaning that the injector 18 is mounted in a centre region of the engine cylinder head 12 among the intake and outlet valves 14, 16. The injector 18 has a longitudinal injector axis 20 which is aligned with the cylinder axis 6. Alternatively, as shown in FIG. 2, the fuel injector 18 may be mounted to the side of the cylinder 4 where the intake valve 14 is installed. In this case, the injector axis 20 is titled at an angle (e.g., of about 70°) with respect to the cylinder axis 6.

Figure 3:
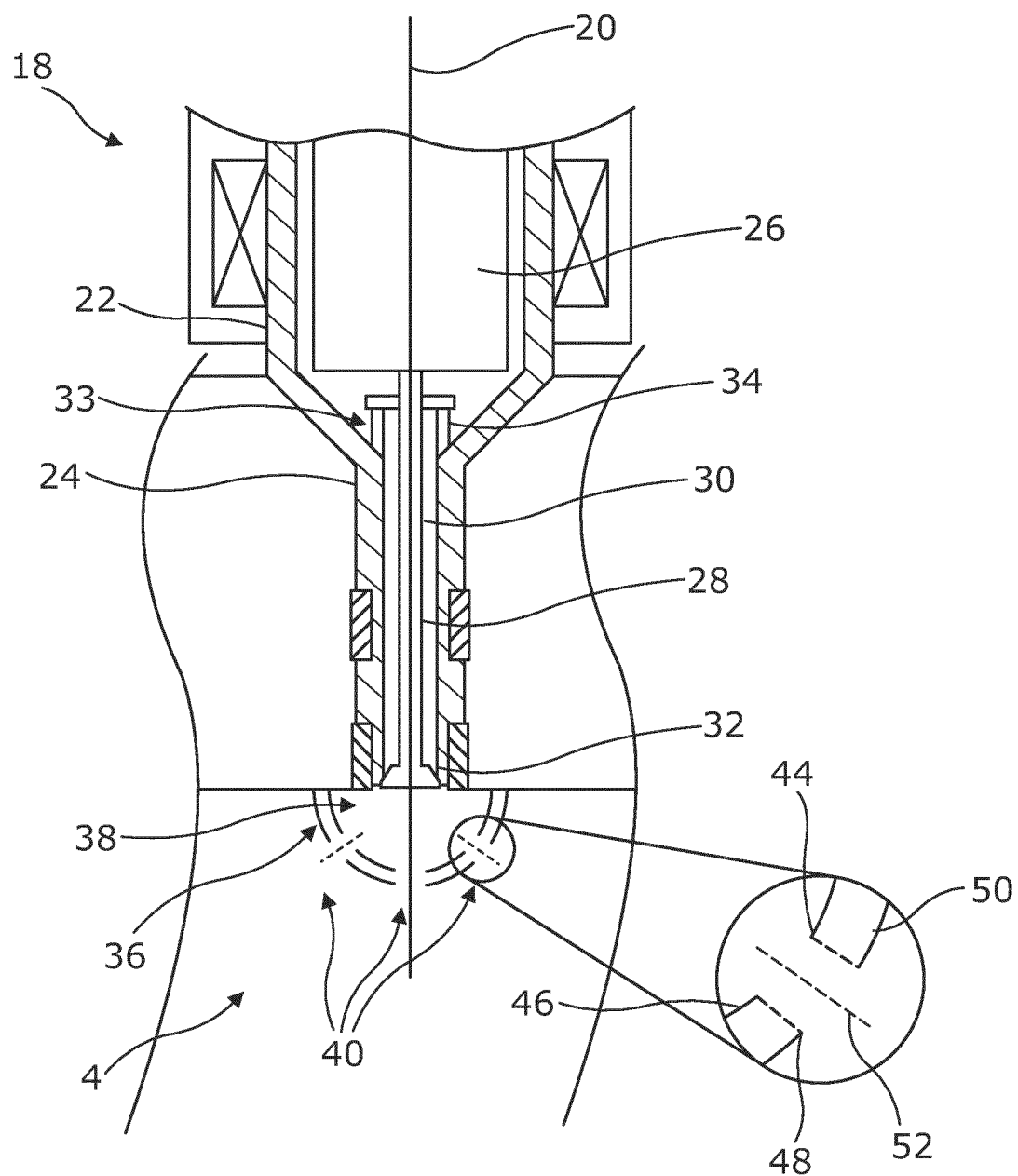
FIG. 3 is a cross section of an injection nozzle for use in the fuel injector in FIGS. 1 and 2.

FIG. 3 shows an embodiment of the fuel injector 18 which is an outward opening type. As shown, the injector 18 comprises an injector body 22 and an elongated valve housing 24 (also known as a 'nozzle') having the longitudinal injector axis 20. The injector body 22 houses an actuator arrangement 26 that is configured to act on an injection valve needle 28 (or 'pintle') contained within the nozzle 24. The injection nozzle 24 has a tip region that is shaped to define a valve seat 32 that extends about a central outlet opening for gaseous fuel. The valve needle 28 is biased against the valve seat 32 by means of a closure spring 34.

The nozzle 24 houses a supply of fuel in an annular chamber 30 that surrounds the needle 28. The valve needle 28 is configured to be slidingly actuated along the injector axis 20 in order to open and close the valve needle 28 against the valve seat 32 as required. When the valve needle 28 is in a closed position, an end of the needle 28 engages with the valve seat 32 defined at a tip region of the nozzle 24 so as to block the flow of fuel out of the nozzle 24. When the valve needle 28 is actuated to move downwards (in the orientation of the Figures), the end of the valve needle 28 moves away from the valve seat 32 thereby allowing the fuel to flow out of the tip region of the nozzle 24 and into the combustion chamber 4. In other words, the valve needle 28 is moved into an open position under the force of the actuator 26.

In the present embodiment, actuation of the valve needle 28 is achieved by way of an electromagnetic actuator. Other forms of actuation are acceptable, such as piezoelectric actuators.

The nozzle 24 includes a nozzle cap 36, which defines a sac volume 38 and is positioned over the tip region of the nozzle 24. The nozzle cap 36 is hemispherical in shape, however, other embodiments in which the nozzle cap 36 is cylindrical in shape with a hemispherical end or taking other axisymmetric form are possible. As will be described in more detail below, the nozzle cap 36 comprises a plurality of holes or openings 40, each opening 40 defining a flow passage through the wall of the nozzle cap 36 so as to enable the fuel to flow from the tip region of the nozzle 24 into the combustion chamber 4 via the sac volume 38 when the valve needle 28 is in the open position. That is to say, the injection needle 28 is configured to be slidably received in the injection nozzle 24 and engageable with the valve seat 32 so as to control the flow of fuel into the sac volume 38 of the fuel injector 18. Accordingly, when the needle 28 is moved away from the valve seat 32, gaseous fuel passes from the sac volume 38 and through the plurality of openings 40 into the combustion chamber 4. The nozzle cap 36 has a central longitudinal axis 42 which aligns with the longitudinal axis of the injector 20.

Each opening 40 extends from an inlet 44 at an inner surface 46 of the nozzle cap 36 to an outlet 48 at an outer surface 50 of the nozzle cap 36 along an opening axis or central flow axis 52 which is a symmetrical axis of the respective opening. Each inlet 44 opens into the sac volume 38 while each outlet 48 opens into the combustion chamber 4. Accordingly, the opening axis 52 corresponds to a general direction of fuel flow from the inside of the nozzle cap 36 (i.e. the sac volume 38) to the outside of the nozzle cap 36 (i.e. the combustion chamber 4), although the precise motion of the fuel is more complicated.

The inlet 44 of each opening 40 is similarly shaped to the outlet 48 of the respective opening 40. In this way, the walls of the opening 40 through the nozzle cap 36 are parallel to each other, thereby providing a cylindrical passage through which fuel can flow. In other words, the diameter of each opening 40 is constant along its length. Flow of fuel from cylindrical passages is advantageously robust and less susceptible to collapse. In instances where the opening axis 52 of an opening 40 is perpendicular to the inner and outer surfaces 46, 50 of the nozzle cap 36, the inlet and outlet 44, 48 of the opening 40 have a circular cross section in a plane tangential to the outer surface 50 of the nozzle cap 36. Conversely, embodiments are contemplated where the opening axis 52 is at a non-perpendicular angle to the inner and outer surfaces of 46, 50 the nozzle cap 36. In such instances, the inlet and outlet 44, 48 are of elliptical cross section in a plane tangential to the outer surface 50 of the nozzle cap 36.

Generally, the plurality of openings 40 is configured to provide a controlled spray plume and may be optimised according to the requirements of the engine arrangement 2. Specifically, the openings 40 are configured to direct fuel jets, or portions of the fuel flow, to various zones within the combustion chamber 4 in order to achieve maximum flow separation and promote efficient air-fuel mixing. As will be explained in more detail below, the openings 40 are grouped in sets of openings according to the zones of the combustion chamber to which they direct fuel jets.

The optimal spray plume, and thus the optimal configuration of openings 40, for a particular engine 2 depends on the injector 18 mounting position as well as the type of air motion within the cylinder 4. There are two general air motions which may be achieved depending on the arrangement of the air inlet and outlet ducts 8, 10. Swirl motion is defined by a rotational motion of the incoming air about the cylinder axis 6, while tumble motion is defined by a rotational motion of the incoming air about an axis which is normal to the cylinder axis 6. Therefore, several arrangements for the plurality of openings 40 in the nozzle cap 36 are contemplated and described with reference to the embodiments shown in FIGS. 4 to 9.

In each arrangement, the plurality of openings 40 is comprised of at least a first set of openings and a second set of openings. Generally, one or more sets of openings are configured to direct fuel so that it interacts with the tumbling or swirling air motion within the cylinder, thus actively mixing with the air as it circulates the cylinder. Inevitably, however, the circulating air and fuel does not effectively reach all regions within the cylinder when only one set of openings is used. Therefore, one or more further sets of openings are configured to direct fuel so that it flows to regions of the cylinder that is largely inaccessible by the fuel directed through the first set of openings, thereby improving the air-fuel mixing achieved. Accordingly, the first set of openings is configured to direct fuel into a first zone of the cylinder, which may be a defined in a lower portion of the cylinder, while the second set of openings is configured to direct fuel into a second zone of the cylinder, which may be defined in an upper portion of the cylinder. The two zones preferably comprise different portions of the cylinder, but it is contemplated that they may overlap.

Figure 4:
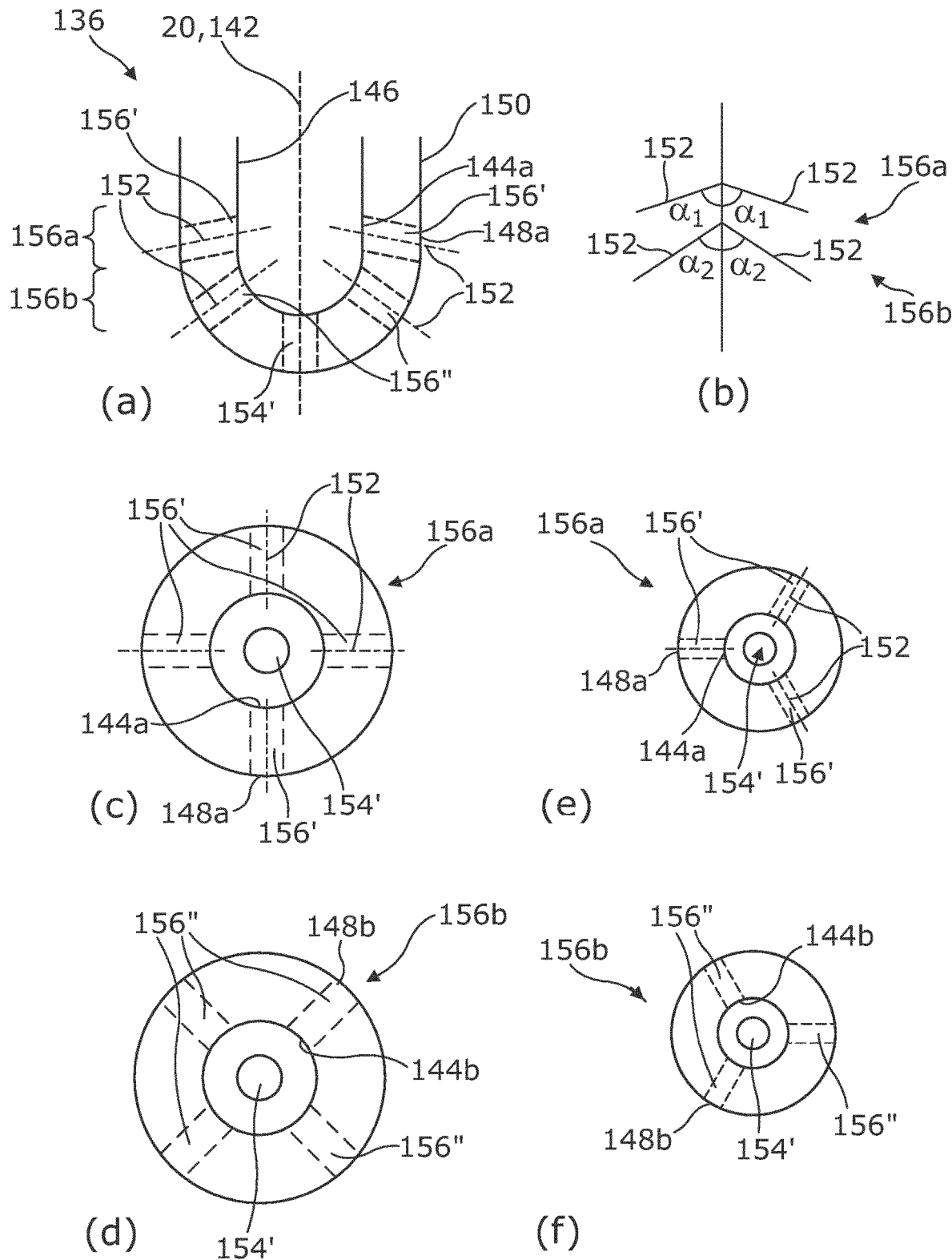
FIG. 4(a) is a cross section, in a plane parallel to the longitudinal axis of the injection nozzle, through a nozzle cap for use with the injection nozzle in FIG. 3, to illustrate first and second rows of holes of the nozzle.
FIG. 4(b) is a schematic illustration to show the angles of the rows of holes in the nozzle cap in FIG. 4(a)
FIGS. 4(c) and 4(d) are cross section views, taken at different positions on the longitudinal axis of the nozzle cap, through a plane perpendicular to the longitudinal axis of the injection nozzle, to show one example configuration for the rows of holes in the nozzle cap in FIGS. 4(a) and (b)
FIGS. 4(e) and 4(f) are cross section views, taken at different positions on the longitudinal axis of the nozzle cap, through a plane perpendicular to the longitudinal axis of the injection nozzle, to show another example configuration for the holes in the nozzle cap in FIGS. 4(a) and (b)
Figure 5:
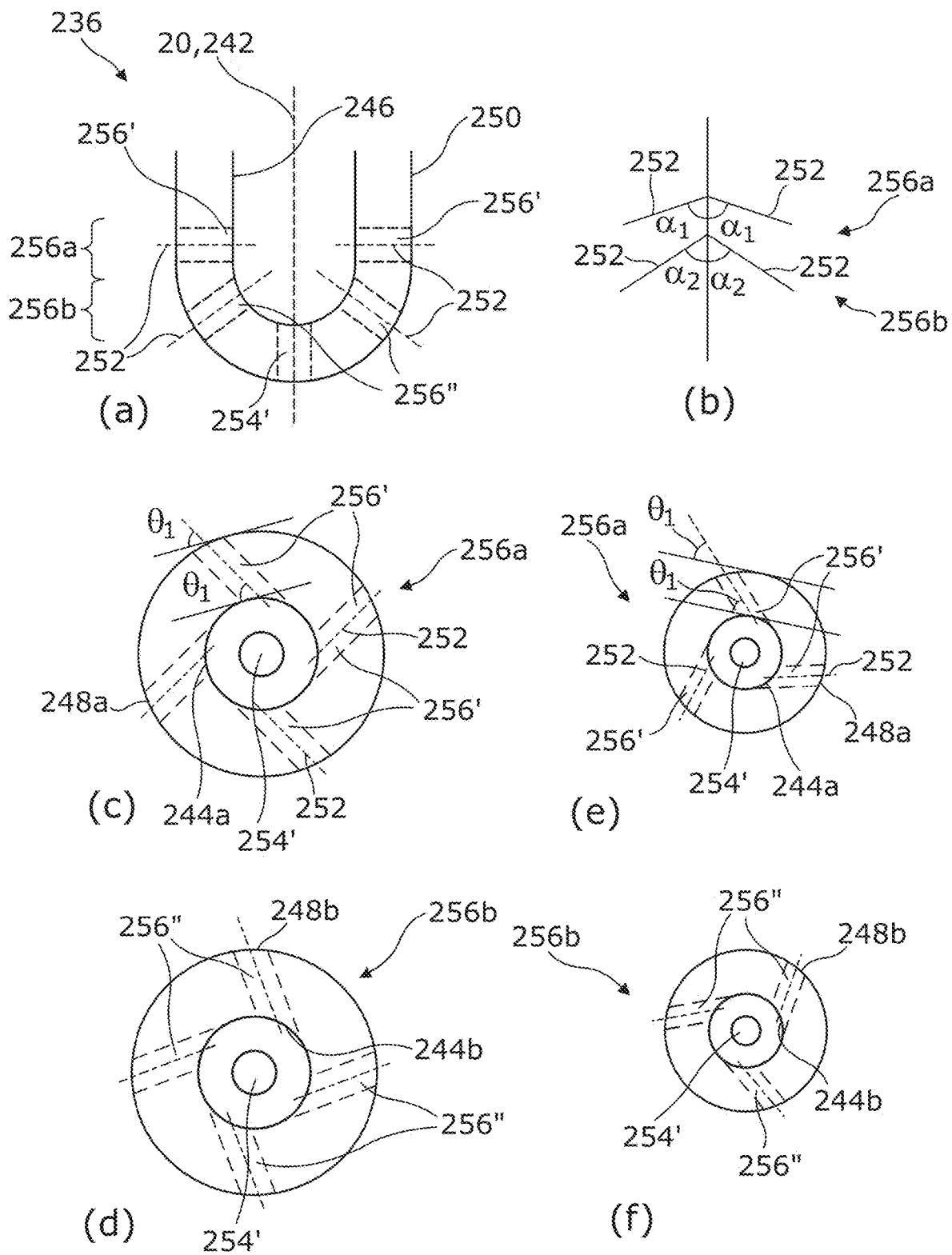
FIG. 5(a) is a cross section view, in a plane parallel to the longitudinal axis of the injection nozzle, through a nozzle cap for use with the injection nozzle in FIG. 3, to illustrate an alternative arrangement of first and second rows of holes compared to FIG. 4.
FIG. 5(b) is a schematic illustration to show the angles of the rows of holes in the nozzle cap in FIG. 5(a)
FIGS. 5(c) and 5(d) are cross section views, taken at different positions on the longitudinal axis of the nozzle cap, through a plane perpendicular to the longitudinal axis of the injection nozzle, to show one example configuration for the holes in the nozzle cap in FIGS. 5(a) and (b)
FIGS. 5(e) and 5(f) are cross section views, taken at different positions on the longitudinal axis of the nozzle cap, through a plane perpendicular to the longitudinal axis of the injection nozzle, to show another example configuration for the holes in the nozzle cap in FIGS. 5(a) and (b)
Figure 6:
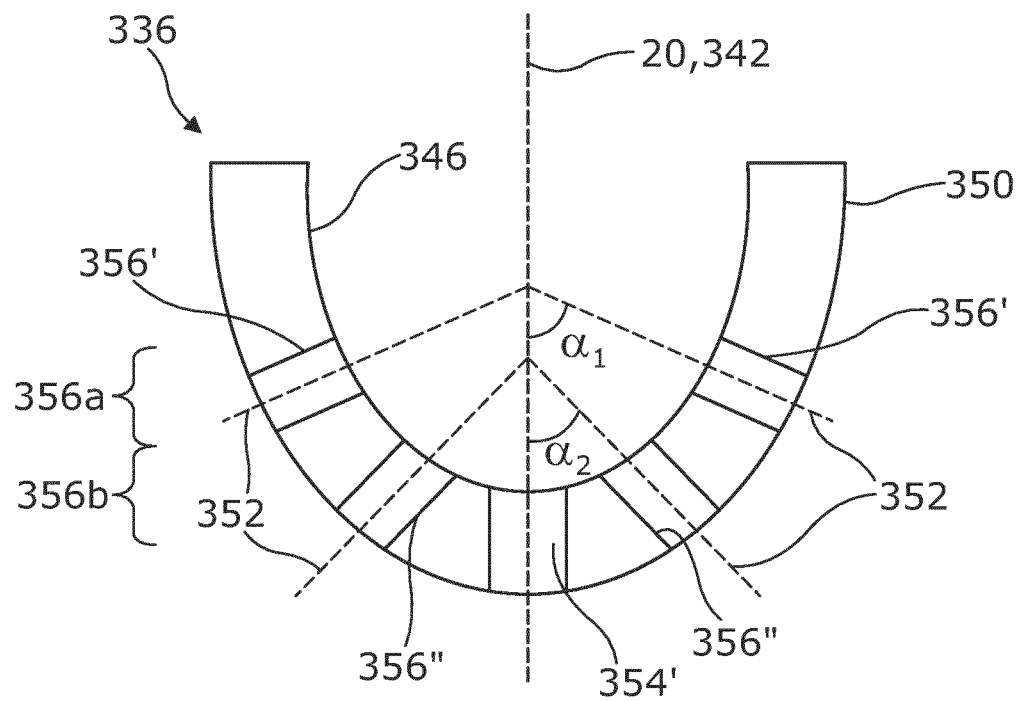
FIG. 6(a) is a cross section view, in a plane parallel to the longitudinal axis of the injection nozzle, through a nozzle cap for use with the injection nozzle in FIG. 3, to illustrate an alternative arrangement of first and second rows of holes to those shown in FIGS. 4 and 5.
FIG. 6(b) is a cross section view, through a plane perpendicular to the longitudinal axis of the injection nozzle, to show the configuration for the holes in the nozzle cap in FIG. 6(a)
Figure 6:
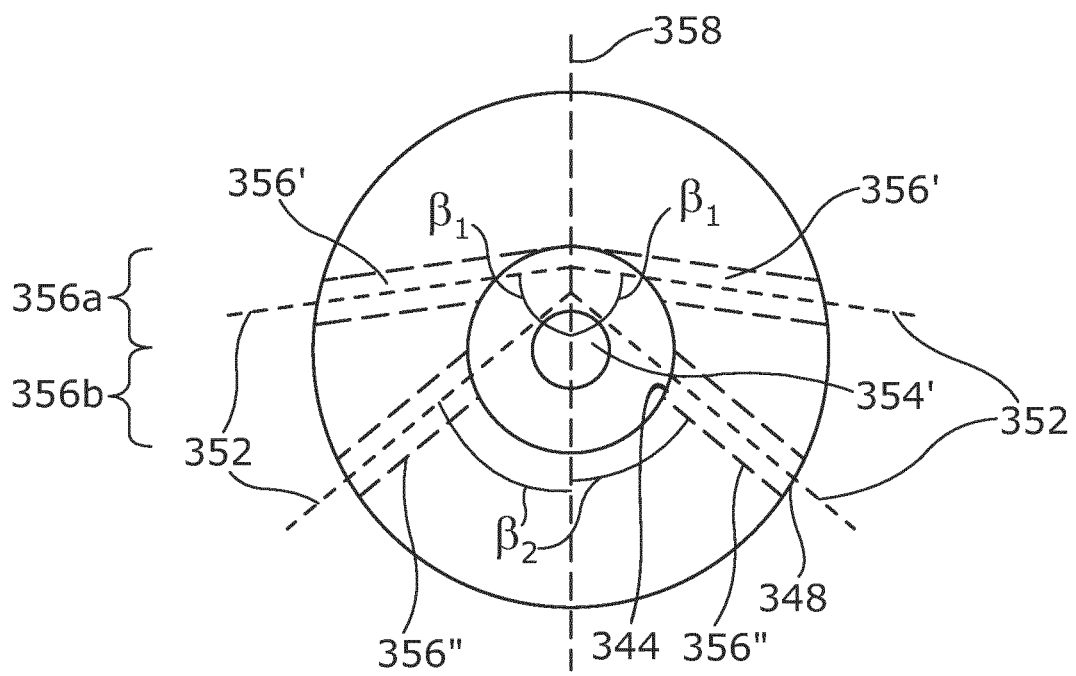

In the arrangements of FIGS. 4 to 6, the first set of openings consists of only one opening 154' which is arranged in the nozzle cap 36 to have an opening axis 52 which aligns with the longitudinal injector axis 20. That is to say, the one opening is arranged to extend from a circular inlet 44 at the centre of the inner surface 46 of the nozzle cap 36 to a circular outlet 48 at the centre of the outer surface 50 of the nozzle cap 36 in a cylindrical manner. The diameter of the inlet and outlet 44, 48 are substantially the same and the internal diameter of the one opening is constant along its length.

Additionally, each aperture or opening of the second set of openings is offset from the centre of the nozzle cap 36 and arranged to extend from the inner surface 46 of the nozzle cap 36 to the outer surface 50 of the nozzle cap 36 in a cylindrical manner. The internal diameter of each second set opening is different to, and preferably smaller than, the internal diameter of the first set opening so that the fuel flow rate through the first set opening is different to, and preferably greater than, the fuel flow rate through each second set opening.

These arrangements further comprise a third set of openings, similar to the second set of openings in that each aperture or opening of the third set is offset from the centre of the nozzle cap 36 and arranged to extend from the inner surface 46 of the nozzle cap 36 to the outer surface 50 of the nozzle cap 36 in a cylindrical manner. In the embodiments shown, the internal diameter of each third set opening is the same as the internal diameter of the second set openings, but it is contemplated that they could be different.

More specifically, FIGS. 4a to 4f show embodiments of a centre-mounted injector 18 with a nozzle cap 136 optimised for a tumble motion cylinder 4. FIGS. 4a and 4b depict the nozzle cap as seen from the side, while FIGS. 4c and 4d provide cross-sectional plan views of one embodiment and FIGS. 4e and 4f provide cross-sectional plan views of another embodiment. In both embodiments, the nozzle cap 136 comprises a first opening 154' and second and third sets of openings, 156a, 156b respectively, as described above.

The second set of openings 156a includes four apertures or openings 156', each of which has a respective inlet 144a and a respective outlet 148a. The inlets 144a of the openings of the second set 156a are equiangularly spaced on the inner surface of the nozzle cap 136 around an axis 142 of the nozzle cap (the longitudinal nozzle cap axis) which is aligned with the injector axis 20. The inlets 144a are defined in a plane perpendicular to the longitudinal injector axis 20/nozzle cap axis 142. The third set of openings 156b also includes four apertures or openings 156", each of which has a respective inlet 144b and a respective outlet 148b. The inlets 144b of the openings of the third set 156b are equiangularly spaced on the inner surface 146 of the nozzle cap 136 around the longitudinal nozzle cap axis 142 and are defined in a plane perpendicular to the longitudinal injector axis 20/nozzle cap axis 142.

Likewise, the outlets 148a of the openings of the second set 156a are equiangularly spaced on the outer surface of the nozzle cap 136 (i.e. around the longitudinal nozzle cap axis 142) and are defined in a plane perpendicular to the longitudinal injector axis 20, and the outlets 148b of the openings of the third set 156b are equiangularly spaced on the outer surface of the nozzle cap 136 around the longitudinal nozzle cap axis 142 and are defined in a plane perpendicular to the longitudinal injector axis 20.

The opening axis 152 of each opening 156' of the second set 156a defines an angle to the longitudinal nozzle cap axis 142 which is the same as for the other openings in the second set 156a. Likewise, the opening axis 152 of each opening 156" of the third set 156b defines an angle to the longitudinal nozzle cap axis 142 which is the same as for the other openings in the third set 156b. Further, the centre of the inlet 144a of each of the openings 156' of the second set 156a lies on the same plane perpendicular to the longitudinal injector axis 20 as for the inlets 144a of the other openings in the same set, and the centre of the inlet 144b of each of the openings 156" of the third set 156b lies on the same plane (i.e. the inlet plane) perpendicular to the longitudinal injector axis 20 as for the inlets 144b of the other openings in the third set 156b. Likewise, the centre of the outlet 148a of each opening of the second set 156a lies on the same plane (i.e. the outlet plane) perpendicular to the longitudinal injector axis 20 as for the outlets 148a of the other openings 156' of the second set, and the centre of the outlet 148b of each opening of the third set 156b lies on the same plane (i.e. the outlet plane) perpendicular to the longitudinal injector axis 20 as for the outlets 148b of the other openings 156" of the third set 156b. That is to say, the fluid path through each opening 156' 156" in a set 156a, 156b is of the same length.

The second and third sets of openings 156a, 156b are arranged relative to each other about the longitudinal injector axis 20 such that the inlet and outlet planes of the second set 156a are further away from the cylinder 4 (i.e. axially higher in the orientation of the Figures) than the inlet and outlet planes of the third set of openings 156b. In other words, the inlet and outlet planes of the third set 156b of openings 156" adopt a lower position along the longitudinal injector axis 20 than the inlet and outlet planes of the second set 156a of openings 156'. Further, as shown in FIG. 4b, the angle $\alpha_1$ of the opening axis 152 relative to the longitudinal injector axis 20 defined for the second set 156a is different to, and preferably larger than, the angle $\alpha_2$ of the opening axis 152 relative to the longitudinal nozzle cap axis 142 defined for the third set 156b.

Furthermore, the respective inlets 144a, 144b of the second and third set openings 156', 156" are angularly spaced apart around the inner surface of the nozzle cap 136 (in their planes perpendicular to the nozzle cap axis 142) so that they are not axially aligned with one another in their respective planes. Similarly, the respective outlets 148a of the second set of openings 156a are equiangularly spaced around the outer surface of the nozzle cap 136 are alternately and equiangularly spaced around the inner surface of the nozzle cap 136 (in their plane perpendicular to the nozzle cap axis 142) so that they are not axially aligned with the respective outlets 148b of the third set of openings 156b. This provides an alternating configuration of the inlets 144a, 144b, equiangularly spaced around the longitudinal nozzle cap axis 142 whereby the inlets 144a of the second set of openings 156a are interspersed between the inlets 144b of the third set of openings 156b and a similar configuration of the outlets 148a, 148b which are arranged in the same alternating manner. This is especially clear when looking at the plan views of the openings. The opening axes 152 of the second and third sets of openings 156a, 156b are therefore not axially aligned with one another.

FIGS. 4(e) and 4(f) show a similar embodiment to that described with reference to FIGS. 4(c) and 4(d), except that there are only three openings 156', 156" in each of the second and third sets. As before, the inlets 144a and outlets 148a of the openings of the second set 156a and the inlets 144b and outlets 148b of the openings of the third set 156b are arranged such that the opening axes of the second and third sets of openings are not axially aligned. The inlets 144a of the second set of openings 156a and the inlets 144b of the third set of openings 156b are alternately and equiangularly spaced around the inner surface of the nozzle cap 136 (in their respective planes perpendicular to the nozzle cap axis 142) so that the inlets 144a of the second set of openings 156a are interposed between the inlets 144b of the third set of openings 156b (this is especially clear when looking at the plan views of the openings). Likewise, the outlets 148a of the second set of openings 156a and the outlets 148b of the third set of openings 156b are alternately and equiangularly spaced relative to one another around the outer surface of the nozzle cap 136 so that the outlets 148a of the second set of openings 156a are interposed between the outlets 148b of the third set of openings 156b (this is especially clear when looking at the plan views of the openings).

In the embodiment of FIGS. 4(c) and 4(d), the second and third sets of openings 156a, 156b each comprise four openings, 156', 156", respectively, while in the embodiment of FIGS. 4e and 4f, the second and third set of openings 156a, 156b each comprise only three openings 156', 156", respectively. It is further contemplated that each set of openings 156a, 156b may comprise up to eight openings, for example.

In each case, the third set 156b of openings is arranged relative to the second set 156a of openings such that the nozzle cap 136 has at least one plane of symmetry in the vertical direction. It should be noted, however, that any arrangement of openings which gives the nozzle cap 136 at least one plane of symmetry in the vertical direction is particularly suitable for a centre mounted injector 18 of a tumble motion cylinder 4. Such an arrangement of second and third sets of openings 156', 156", in combination with the single opening 154' as described above, will produce an unbiased spray pattern which evenly distributes the fuel within the compression chamber 4. Specifically, the first opening 154', being aligned with the longitudinal injector axis 20 and thus being parallel with the cylinder axis 6, targets fuel into a lower portion of the cylinder so that it interacts with the tumble motion of air in the cylinder 4. The second and third set openings 156', 156" being angled away from the longitudinal injector axis, target fuel to an upper portion of the cylinder where fuel targeted through the first set opening cannot effectively reach. By virtue of this opening arrangement, the injection of fuel is less likely to disrupt the tumble motion initiated by the air intake 8. Thus, the tumble motion of air can be exploited to promote better air-fuel mixing.

FIGS. 5a to 5f show embodiments of a centre mounted injector 18 with a nozzle cap 236 optimised for a swirl motion cylinder 4. The injection nozzle cap 236 includes a first opening 254' and second and third sets of openings, 256a, 256b respectively, having second and third set openings, 256', 256" respectively. More specifically, FIGS. 5a and 5b depict the nozzle cap 236 as seen from the side, while FIGS. 5c and 5d provide cross-sectional plan views of one embodiment and FIGS. 5e and 5f provide cross-sectional plan views of another embodiment. These embodiments differ from those described above with reference to FIGS. 4a to 4f in that the inlet 244a, 244b of each second and third set of openings 256', 256" is angularly offset from each respective outlet 248a, 248b such that each opening axis 252 defines an angle $\theta_1$ between the inner and outer surfaces 246, 250 of the nozzle cap 236. Accordingly, the inlets 244a, 244b and outlets 248a, 248b of each of the second and third set openings 256', 256" are elliptical in shape. The angle $\theta_1$ defined for each second and third sets of openings 256', 256" is the same as for all other second and third sets of openings 256', 256" in the arrangement.

Although the nozzle cap according to these embodiments does not have a plane of symmetry in the vertical direction, the nozzle cap does have rotational symmetry. The embodiment of FIGS. 5c and 5d comprise four openings 256', 256", respectively, in each of the second and third sets and so the openings are arranged to provide rotational symmetry to the order of four. Similarly, in the embodiment of FIGS. 5e and 5f each of the second and third sets comprise three openings 256', 256", and so the openings are arranged to provide rotational symmetry to the order of three. Other embodiments are contemplated in which each of the second and third sets comprise up to eight openings being arranged such the rotational symmetry order increases correspondingly. By virtue of this rotational symmetry, the arrangement of openings will produce an unbiased spray pattern which evenly distributes the fuel within the compression chamber 4.

The second and third set openings 256', 256", being angled between the inner and outer surfaces of the nozzle cap, direct fuel such that it enters the cylinder with rotational momentum in the direction of the swirl motion induced by the air intake. Accordingly, the fuel flow from the second and third set openings 256', 256" is encouraged to interact with the swirl motion in an upper portion of the cylinder. Meanwhile, the first set opening 254', being aligned with the longitudinal injector axis 20 and thus being parallel with the cylinder axis 6, targets fuel into a lower portion of the cylinder so that it induces a tumble motion of air in the cylinder which compliments the swirl motion induced by the air intake. This leads to greater circulation within the cylinder and thus greater air-fuel mixing.

Referring to FIG. 5b, the angle $\alpha_1$ of the opening axis 252 relative to the longitudinal nozzle cap axis 242 defined for the second set of openings 256a is different to, and preferably larger than, the angle $\alpha_2$ of the opening axis 252 relative to the longitudinal nozzle cap axis 242 defined for the third set of openings 256b. For example, the angle $\alpha_1$ may range between 60 to 75 degrees relative to the longitudinal nozzle cap axis 242, and preferably between 65 to 70 degrees relative to the longitudinal nozzle cap axis 242. Additionally, the angle $\alpha_2$ may range between 40 to 60 degrees relative to the longitudinal nozzle cap axis 242, more preferably between 45 to 50 degrees relative to the longitudinal nozzle cap axis 242.

The configurations of the openings in FIGS. 5(c) and 5(d) and FIGS. 5(e) and (f) are similar to those shown in FIGS. 4(c) and 4(d) and FIGS. 4(e) and 4(f), respectively, in that the inlets 244a, 248a to the openings are equiangularly spaced around the inner surface of the nozzle cap 236, relative to one another and in their respective axial planes, so that they form an alternating arrangement of inlets between the sets (this is especially clear when looking at the plan views of the openings). Likewise, the outlets 244b, 248b from the openings are angularly spaced around the outer surface of the nozzle cap 236, relative to one another and in their respective axial planes, so that they form an alternating arrangement of outlets between the sets (this is especially clear when looking at the plan views of the openings).

FIGS. 6a and 6b show an embodiment of a side mounted injector 18 with a nozzle cap 336 optimised for a tumble motion cylinder 4. More specifically, FIG. 6a depicts the nozzle cap 336 as seen from the side, while FIG. 6b provides a cross-sectional plan view of the nozzle cap 336. As can be seen, the nozzle cap 336 comprises a first set opening 354' as described above and further second and third sets of openings 356a, 356b, with each of the second and third sets of openings 356a, 356b comprising only two openings 356', 356" respectively. As in the previously described embodiments, and as shown in FIG. 6a, the second and third sets of openings 356a, 356b are arranged relative to each other about the longitudinal injection axis 20 such that the inlet and outlet planes of the first set 356a are further away from the cylinder 4 (i.e. higher in the orientation of the Figures) than the inlet and outlet planes of the second set 356b.

Also as above, the opening axis 352 of each opening 356', 356" in the second and third sets 356a, 356b defines an angle to the longitudinal injector axis 20 which is the same as for the other openings 356', 356" in the associated set 356a, 356b. The angle $\alpha_1$ to the longitudinal axis 20 defined for the first set 356a is different to, and preferably larger than, the angle $\alpha_2$ to the longitudinal axis 20 defined for the second set 356b.

However, unlike the previously described embodiments, the second and third set openings 356', 356" are not necessarily arranged equiangularly about the longitudinal nozzle cap axis 342, but they are arranged symmetrically about an axis 358 perpendicular to the longitudinal nozzle cap axis 342 (i.e. a lateral axis).

More specifically, and as shown in FIG. 6b, the outlet 348 of each second set opening 356' is offset from each respective inlet 344 such that each respective opening axis 352 defines an angle 1 to the lateral axis 358 which is the same as for the other minor opening 356' in the set 356b. That is to say, the second set openings 356' are arranged either side of the lateral axis 358 such that the inlet 344 and outlet 348 of one opening 356' are arranged symmetrically to the inlet 344 and outlet 348 of the other opening 356' about the lateral axis 358. The same is true for the third set openings 356"—i.e. the opening axis 352 of each third set opening 356" defines an angle $\beta_2$ to the lateral axis 358 which is same as for the other opening 356" in the set 356b. The angle $\beta_2$ defined by the opening axes 352 of the third set 356b openings 356' is different to and preferably smaller than the angle $\beta_1$ defined by the opening axes 352 of the second set 356a openings 356'. Accordingly, the arrangement of all the second and third set openings 356', 356" is symmetric about the lateral axis 358 and biased such that all the opening axes 352 are angled towards one side of the nozzle cap 336, with the opening axes 352 of the third set 356b being angled more towards that side than the opening axes 352 of the second set 356a.

Since the opening axes 352 of the second and third set openings 356', 356" are not normal to the inner and outer surfaces 342, 350 of the nozzle cap 336, the inlet and outlet 344, 348 of each opening 356', 356" is elliptical in shape so as to maintain parallelism of the opening walls through the nozzle cap 336. The embodiment of FIG. 6 is particularly advantageous for use with an injector side mounted to a tumble motion engine cylinder 4 because the first set opening targets fuel to interact with the tumbling air motion, while the second and third set openings 356', 356" target fuel to the regions either side of the main tumble motion. In this way, the second and third set openings 356' 356" direct fuel to a second zone of the cylinder, that is, one which the fuel from the first set opening does not reach effectively.

Figure 7:
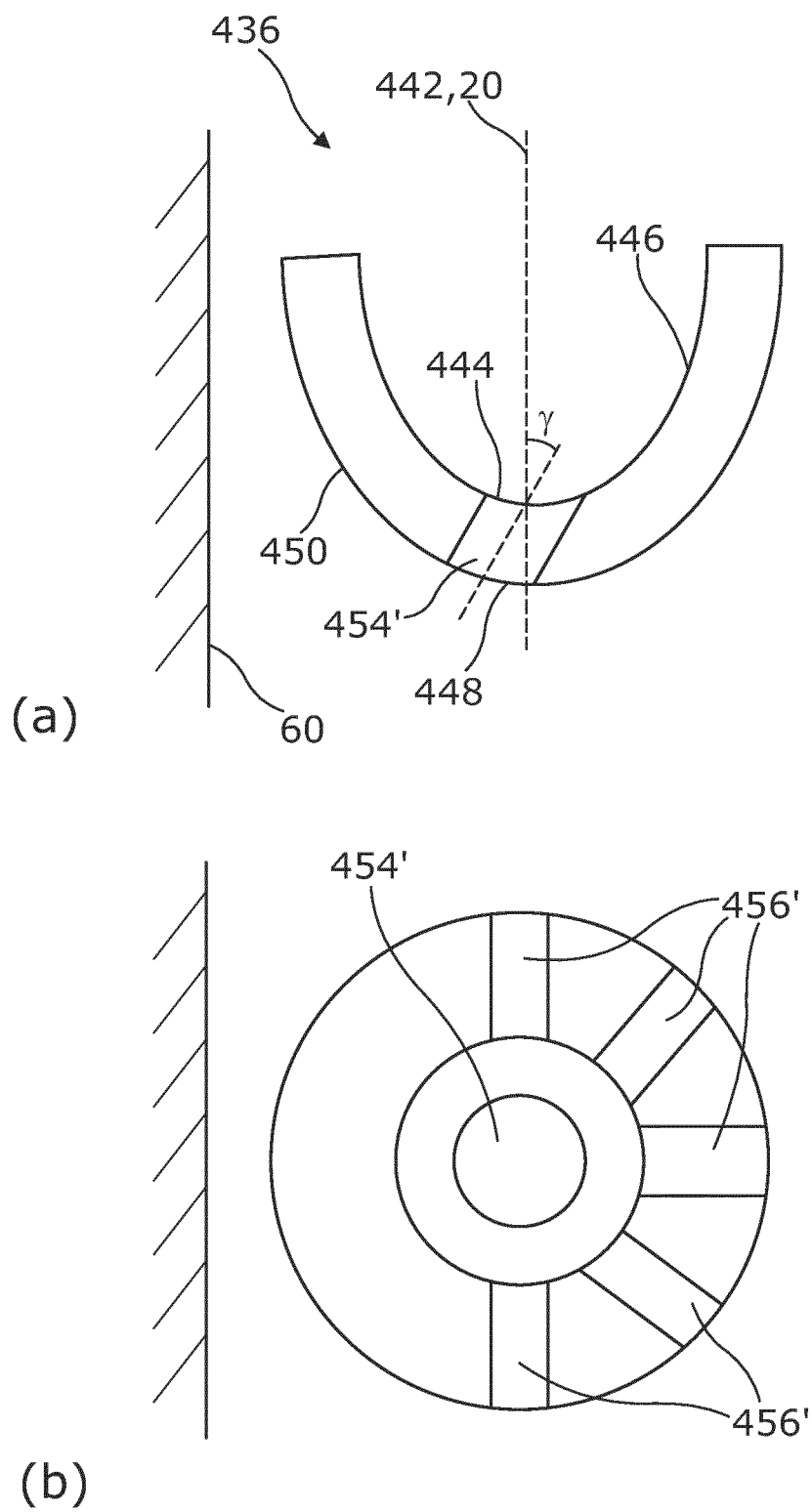
FIG. 7(a) is a cross section view, in a plane parallel to the longitudinal axis of the injection nozzle, through a nozzle cap for use with the injection nozzle in FIG. 3, to illustrate an alternative arrangement of first and second rows of holes compared to FIGS. 4, 5 and 6.
FIG. 7(b) is a cross section view, through a plane perpendicular to the longitudinal axis of the injection nozzle, to show the configuration for the holes in the nozzle cap in FIG. 7(a)

FIG. 7 shows an embodiment of a side mounted injector 18 with a nozzle cap 436 optimised for a swirl motion cylinder 4. As can be seen in FIG. 7a (which shows the nozzle cap 436 as seen from the side), the first opening 454' is similar to that of the previously described embodiments in that it is arranged to extend from an inlet 444 at the centre of the inner surface 446 of the nozzle cap 436 to an outlet 448 at the outer surface 450 of the nozzle cap 436 in a cylindrical manner such that the walls of the opening 454' are parallel to each other. While the inlet 444 is aligned with the centre of the inner surface 446 of the nozzle cap 436, the outlet 448 is offset from the centre of the outer surface 450 of the nozzle cap 436 such that the opening axis 452 defines an angle $\gamma$ to the longitudinal axis 20 of the injector 18. Specifically, the outlet 448 is offset from the longitudinal injector axis 20 so that the opening axis 452 is angled towards a lining 60 of the cylinder 4 associated with the injector 18. In this way, the first opening 454' directs fuel downwards and towards the cylinder lining 60, thereby inducing a swirl motion of fuel within the lower portion (or a first zone) of the cylinder.

Also shown is a second set 456' of openings comprising five openings 456' arranged around the longitudinal nozzle cap axis 442 and with each opening 456' extending cylindrically from respective inlets 444 on the inner surface 446 of the nozzle cap 436 to respective outlets 448 on the outer surface 450 of the nozzle cap 436. The five second set openings 456' are equiangularly spaced around one half of the nozzle cap 436, and specifically around the half of the nozzle cap 436 furthest from the cylinder lining 60. Accordingly, the second set openings 456' direct fuel into the upper portion (or a second zone) of the combustion chamber 4 where the fuel from the first opening 454' does not reach effectively.

It is contemplated that the nozzle cap 436 may comprise additional sets of openings, each similarly arranged about the longitudinal nozzle cap axis 442 as the second set openings 456', but with differing inlet and outlet planes perpendicular to the injector axis 20. Although FIG. 7b indicates five minor openings 456' for the second set 456, any number between two and five per set 456 is considered.

Generally, for a swirl motion side mounting injector as shown in FIG. 7, it is recommended to include between 1 and 3 openings in the nozzle cap 136. One major opening (for example, opening 454') should have at least 60% of the fuel mass or higher. As mentioned, the major jet should be targeted in a way of impinging on the cylinder lining 60 of the wall opposite the injector location.

In any embodiment of the invention for a swirl engine, the first set openings 254', 454' may comprise one opening 254', 454', whilst the second set openings 256', 456' may comprise between one to three openings (for example, for injection of fuel up to 60 bar, in an outward opening injector). There is also a minimum spray momentum requirement for the spray jet to propagate into the combustion chamber, and it has been found that high spray momentum gives better mixing.

In embodiments, the first opening 454' may be at an angle $\gamma$ relative to the longitudinal axis 20 such that the fuel flow through the first opening 454' impinges the cylinder lining 60. Advantageously, the fuel to flow through the opening 454' should be directed so as not to impinge on the spark plug or the air intake port. In this way, the fuel may flow directly into the combustion chamber 4 such that no fuel flow is sucked back into the intake port of the engine 2.

Figure 8:
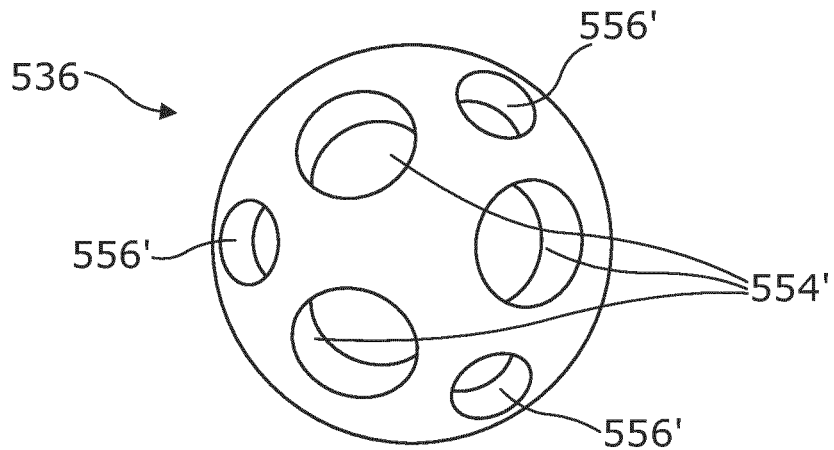
FIGS. 8 to 11 are views from the bottom of various nozzle caps for use with the injection nozzle in FIG. 3.
Figure 9:
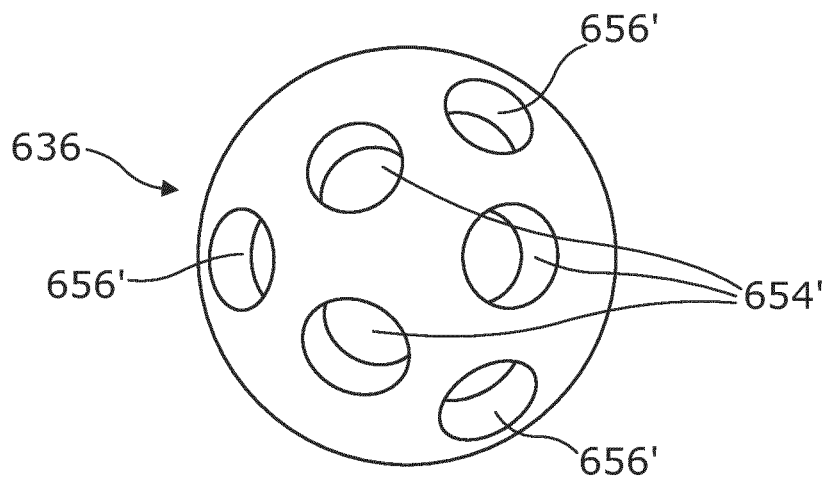
Figure 10:
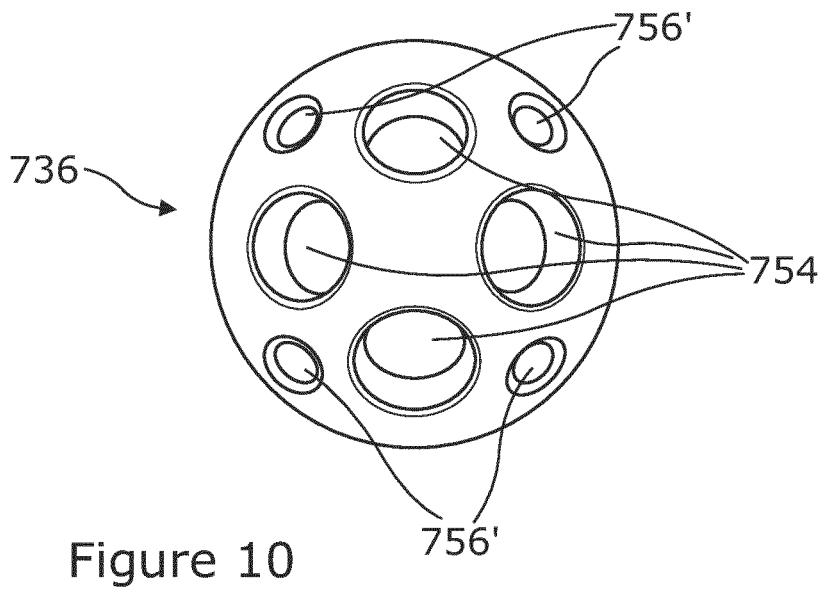

FIGS. 8 to 10 depict other possible nozzle cap embodiments 536, 636, 736 as seen from the bottom when viewed along the longitudinal nozzle cap axis. As can be seen, the plurality of openings 40 is comprised of at least a first set of openings and a second set of openings. Unlike the previously described embodiments, the first set of openings comprise more than one opening—there are three first set openings 554', 654' in the embodiments of FIGS. 8 and 9, and four first set openings 754' in the embodiment of FIG. 10. The second set of openings also comprise more than one opening 556', 656' 756'—three in the embodiments of FIGS. 8 and 9, and four in the embodiment of FIG. 10. In each of these embodiments all of the openings 554', 556', 654', 656', 754', 756' are arranged such that the opening axis is normal to the inner and outer surfaces of the nozzle cap 536, 636, 736. The first and second sets of openings are arranged relative to reach other about the longitudinal nozzle cap axis such that the inlet and outlet planes of the first set are closer to the bottom of the nozzle cap 536, 636, 736 than the inlet and outlet planes of the second set of openings. In the embodiments of FIGS. 8 and 10, the first set openings 554', 654' are larger (in diameter) than the second set openings 556', 656', whereas, in the embodiment of FIG. 9, all the openings 754', 756' have the same diameter.

Also, the first set openings 554', 654', 754' are equiangularly arranged around the longitudinal nozzle cap axis (which aligns with the injector axis 20). Similarly, the second set openings 556', 656', 756' are equiangularly arranged around the longitudinal nozzle cap axis. The first set of openings and the second set of openings are rotated about the longitudinal nozzle cap axis relative to each other such that symmetry in the overall arrangement of both first and second set openings 554', 556', 654', 656', 754', 756' is maintained. More specifically, in the embodiments of FIGS. 8 and 9, the second set of openings is rotationally offset (about the longitudinal nozzle cap axis) from the first set of openings by 120° so that the nozzle cap 536, 636, 736 has three planes of symmetry and a rotational order of symmetry of three about the longitudinal nozzle cap axis. Similarly, in the embodiment of FIG. 10, the second set of openings is rotationally offset (about the longitudinal nozzle cap axis) from the first set of openings by 90° so that the nozzle cap 536, 636, 736 has four planes of symmetry and a rotational order of symmetry of four about the longitudinal nozzle cap axis.

Figure 11:
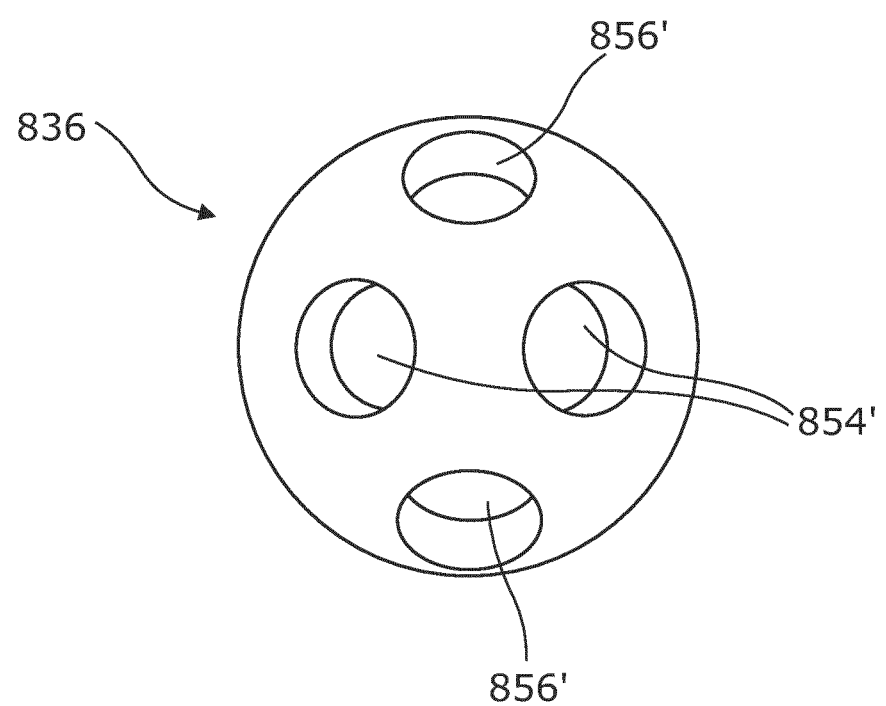

FIG. 11 shows yet another nozzle cap embodiment 836 as seen from the bottom when viewed along the longitudinal nozzle cap axis. As can be seen, the plurality of openings 40 comprises a first set of openings and a second set of openings, each set comprising two openings 854' 856' arranged opposite each other. The second set of openings is arranged rotationally offset from the first set of openings by 90° about the longitudinal nozzle cap axis so that the nozzle cap 836 has two planes of symmetry and a rotational order of symmetry of two.

Figure 12:
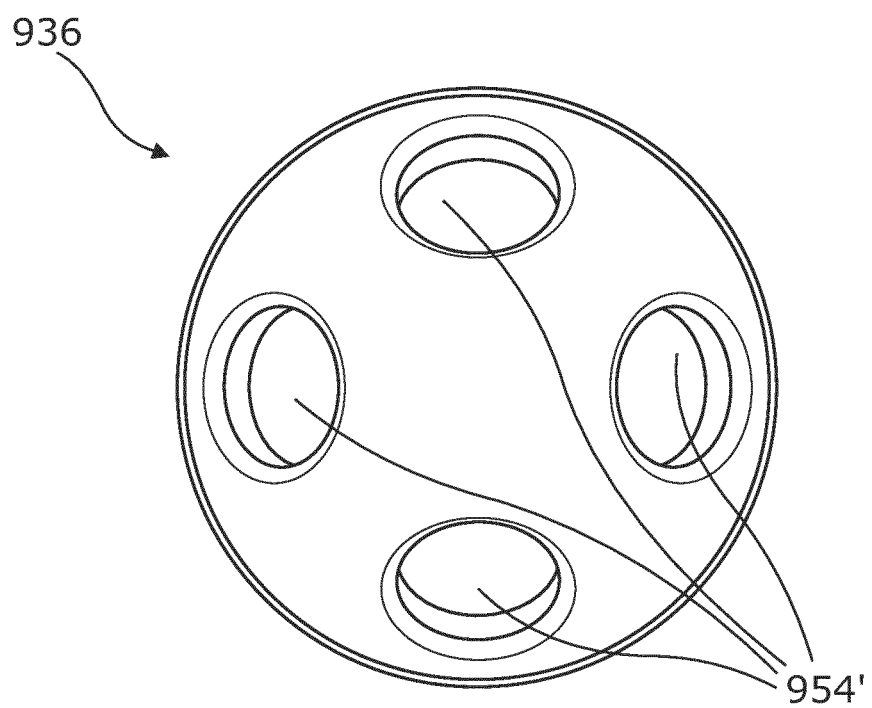
FIG. 12 is an example of an alternative nozzle cap to that shown in FIG. 11.

The first and second sets are arranged relative to each other about the longitudinal injector axis such that the inlet and outlet planes of the first set are closer to the bottom of the nozzle cap 836 than the inlet and outlet planes of the second set of openings. Accordingly, first set of openings direct fuel to a lower portion (or a first zone) of the cylinder, while the second set of openings direct fuel to an upper (or second) zone of the cylinder 4. Finally, FIG. 12 shows an example of a nozzle cap 936 which is identical to FIG. 11 but in which the second set of openings is removed. This may be useful for some cylinder configurations, where effectively the nozzle cap openings are grouped into first and second sets of openings which each direct gaseous fuel into a different region or zone of the combustion space.

Further investigations into the performance of the fuel injector 18 have concluded that high chamber pressures as a result of high load and high engine speed operating conditions result in poorer air-fuel mixing and, therefore, lower engine combustion efficiency overall. Generally, the higher chamber pressures require the fuel injector 18 to operate at higher injection pressures to provide the jet momentum required to achieve performance requirements. Therefore, generally, gaseous fuel injectors with high fuel flow rates provide better flow separation and better performance in high chamber pressures than gas fuel injectors with lower fuel flow rates.

Therefore, the nozzle cap has been designed with an appropriate number of holes with respective diameters to provide optimum jet targeting such that the minimum performance requirements are met for the various engine operating conditions.

It will be appreciated that various modifications may be made to the aforementioned embodiments without departing from the scope of the appended claims.

The invention claimed is:

1. A fuel injector for injecting gaseous fuels into a combustion chamber, the fuel injector comprising:
   an injection nozzle having a longitudinal injector axis and a tip region that is shaped to define a valve seat that extends about a central outlet opening for gaseous fuel; and
   an outward opening injection needle slidably received in the injection nozzle and engageable with the valve seat to control a flow of gaseous fuel into a sac volume of the fuel injector,
   wherein the injection nozzle further includes a nozzle cap having a nozzle cap axis, aligned with the longitudinal injector axis, the nozzle cap being received over the tip region of the nozzle to define the sac volume and being provided with a plurality of openings to enable the flow of gaseous fuel to pass from the sac volume into the combustion chamber when the injection needle is moved away from the valve seat,
   the plurality of openings being comprised of at least:
   a first opening configured to direct a first flow portion of the flow of gaseous fuel into a first zone of the combustion chamber, wherein the first zone is defined by a lower portion of the combustion chamber;
   a second set of openings, configured to direct a second flow portion of the flow of gaseous fuel into a second zone of the combustion chamber, wherein the second zone is defined by an upper portion of the combustion chamber, and wherein each opening of the second set has a second central flow axis which defines a first angle to the longitudinal injector axis which is the same as for the other openings of the second set, wherein the first angle is between 60 to 75 degrees relative to the longitudinal injector axis; and
   a third set of openings, wherein each opening of the third set has a third central flow axis which defines a second angle to the longitudinal injector axis which is different from the first angle defined by the second central flow axis to the longitudinal injector axis, and wherein the second angle is between 40 to 60 degrees relative to the longitudinal injector axis.

2. The fuel injector as claimed in claim 1, wherein the first opening forms one of a first set of openings.

3. The fuel injector of claim 2, wherein the first opening, or each opening of the first set of openings, has a diameter that is different from a diameter of each opening of the second set.

4. The fuel injector as claimed in claim 2, wherein the first opening of the first set of openings has a first central flow axis which aligns with the longitudinal injector axis.

5. The fuel injector as claimed in claim 1, wherein each opening of the second set has an inlet which opens into the sac volume and an outlet which opens into the combustion chamber, wherein a center of the outlet of each opening of the second set lies on a first plane perpendicular to the longitudinal injector axis.

6. The fuel injector as claimed in claim 5, wherein the inlets of each opening of the second set are equiangularly spaced around the nozzle cap axis in the first plane.

7. The fuel injector as claimed in claim 5, wherein each opening of the third set has an inlet which opens into the sac volume and an outlet which opens into the combustion chamber, wherein a center of the outlet of each opening of the third set lies on a second plane perpendicular to the longitudinal injector axis, wherein the second plane adopts a lower position along the longitudinal injector axis than the first plane.

8. The fuel injector as claimed in claim 7, wherein the inlets of each opening of the third set are equiangularly spaced around the longitudinal injector axis in the second plane.

9. The fuel injector as claimed in claim 7, wherein the inlets of the second set of openings are angularly spaced apart from the inlets of the third set of openings around the nozzle cap in their respective planes perpendicular to the longitudinal injector axis; and wherein the outlets of the second set of openings are angularly spaced apart from the outlets of the third set of openings around the nozzle cap in their respective planes perpendicular to the longitudinal injector axis, such that the second central flow axis of the second set of openings is not axially aligned with the third central flow axis of the third set of openings.

10. The fuel injector as claimed in claim 1, wherein each opening of the second set has a diameter that is different from a diameter of each opening of the third set.

11. The fuel injector as claimed in claim 1, wherein the second set of openings includes between two and five openings.

12. A fuel injection system for gaseous fuel comprising the fuel injector of claim 1 and the combustion chamber into which the gaseous fuel is injected.

* * * * *